(12) United States Patent
Gamble (10) Patent No.: US 9,597,740 B2
(45) Date of Patent: Mar. 21, 2017

(54) CUTTING INSERT WITH ELLIPTICAL CUTTING EDGE

(71) Applicant: Kennametal Inc., Latrobe, PA (US)

(72) Inventor: Kevin Michael Gamble, Stahlstown, PA (US)

(73) Assignee: KENNAMETAL INC., Latrobe, PA (US)

( * ) Notice: Subject to any disclaimer, the term of this patent is extended or adjusted under 35 U.S.C. 154(b) by 198 days.

(21) Appl. No.: 14/528,840

(22) Filed: Oct. 30, 2014

(65) Prior Publication Data

US 2016/0121410 A1    May 5, 2016

(51) Int. Cl.
*B23C 5/20*    (2006.01)
*B23C 5/06*    (2006.01)

(52) U.S. Cl.
CPC ........... *B23C 5/207* (2013.01); *B23C 5/06* (2013.01); *B23C 2200/0416* (2013.01); *B23C 2200/203* (2013.01); *B23C 2220/28* (2013.01); *B23C 2265/16* (2013.01)

(58) Field of Classification Search
CPC ............ B23C 5/207; B23C 2200/08; B23C 2200/083; B23C 2200/088; B23C 2200/045; B23B 2200/08; B23B 2200/083; B23B 2200/088; B23B 2200/045; B23B 2200/0466

See application file for complete search history.

(56) References Cited

U.S. PATENT DOCUMENTS

| | | | |
|---|---|---|---|
| 3,464,098 A | 9/1969 | Moore et al. | |
| 4,699,549 A * | 10/1987 | Shimomura | B23B 51/048 407/113 |
| 4,812,087 A * | 3/1989 | Stashko | B23C 5/109 407/113 |
| 4,840,518 A * | 6/1989 | Plutschuck | B23B 27/145 407/113 |
| 5,741,095 A * | 4/1998 | Charron | B23C 5/1027 407/113 |
| 5,957,629 A | 9/1999 | Roman et al. | |
| 7,229,236 B2 * | 6/2007 | Craig | B23C 5/109 407/113 |

(Continued)

FOREIGN PATENT DOCUMENTS

| | | | | |
|---|---|---|---|---|
| DE | 8207800 U1 | 8/1982 | | |
| DE | 3210059 A1 | 9/1983 | | |
| DE | 3618574 A1 * | 12/1986 | | B23B 51/048 |

*Primary Examiner* — Daniel Howell
*Assistant Examiner* — Ryan Rufo
(74) *Attorney, Agent, or Firm* — Matthew S. Bedsole (57) ABSTRACT

A cutting insert for a cutting tool is described. The cutting insert includes a front surface, a generally planar rear surface opposite the front surface, a generally planar first end surface, a generally planar second end surface opposite the first end surface, a generally planar first side surface, a generally planar second side surface opposite the first side surface. The front surface is continuously convex extending entirely between the first and second surfaces and entirely between the first and second side surfaces. At least one end surface is formed with a clearance angle (A1, A2, A3) to produce a cutting edge that is elliptical in shape having a relatively small depth-of-cut (DOC) to produce an extremely fine finish on a workpiece.

17 Claims, 9 Drawing Sheets

(56) References Cited

U.S. PATENT DOCUMENTS

| | | | | |
|---|---|---|---|---|
| 7,775,750 B2* | 8/2010 | Satran | ................... | B23C 5/207 |
| | | | | 407/113 |
| 8,308,399 B2* | 11/2012 | Yoshida | ............... | B23F 21/146 |
| | | | | 407/20 |
| 2005/0023044 A1 | 2/2005 | Schuffenhauer et al. | | |
| 2006/0280568 A1* | 12/2006 | Craig | ................... | B23C 5/109 |
| | | | | 407/113 |

* cited by examiner

CUTTING INSERT WITH ELLIPTICAL CUTTING EDGE

FIELD OF THE INVENTION

In general, the invention relates to a cutting insert and a rotary cutting tool, and in particular to an indexable cutting insert for a milling cutter having an elliptical cutting edge with a relatively small depth-of-cut, DOC, that creates a high-shear, slicing cutting action for generating a smooth finish on a workpiece.

BACKGROUND OF THE INVENTION

One of the current concerns in indexable finish style milling is the stepped or wavy surface on the milled surface resulting from current technology, specifically in the areas of face and end milling. This stepped, uneven or otherwise irregular finish is typically a result of the type, position and location of the cutting inserts. This stepping is particularly relevant in attempts at all-in-one mills, that is mills capable of three dimensional milling, including plunging, ramping, circle interpolating, facing, and end milling with the same mill.

According to the milling users, this stepped surface is often unacceptable, particularly when a finished, not rough, flat surface is desired. This stepping is unacceptable because stress points form at each or some of the inner and outer edges of the steps as these edges are often well defined. This forces the milling user to thereafter finish mill the surface that is an additional time consuming and expense-adding step.

Such improvement continues to be sought by mill users in various industries because such reduction or complete elimination of all stepping and waviness will increase the overall life of the metal end product by reducing and/or eliminating stress, fatigue and other undesirable forces working against the metal end product. In conjunction with this, if such milling cutter could perform all or substantially all of the typical milling steps including ramping, plunging, circle interpolation, facing and end milling, then significant cost and time reduction would also be achieved. Finally, if all such milling steps could be achieved by one milling cutter, the cutter must have a reasonable life as these various steps involve different concerns and factors including the subjecting of the cutter to large axial, radial, and tangential forces, possibly simultaneously.

SUMMARY OF THE INVENTION

The problem of producing a fine finish on a workpiece is solved by providing a cutting insert with a continuously convex front surface and an elliptical cutting edge having a relatively small depth-of-cut.

In one aspect of the invention, a cutting insert comprises a front surface, a generally planar rear surface opposite the front surface, a generally planar first end surface, a generally planar second end surface opposite the first end surface, a generally planar first side surface, a generally planar second side surface opposite the first side surface, a first cutting edge formed at an intersection between the front surface and the first end surface, wherein the front surface is continuously convex and extends entirely between the first and second surfaces and entirely between the first and second side surfaces, and wherein the first cutting edge is elliptical in shape.

In another aspect, a milling cutter comprises a cutter body with a plurality of insert-receiving pockets, and a cutting insert of the invention is mounted in each of the plurality of insert-receiving pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring now to FIGS. 1-5, an indexable cutting insert 10 is shown according to an embodiment of the invention. In general, the cutting insert 10 is typically manufactured by form-pressing and sintering carbide powders using methods well-known in the art. The cutting insert 10 is generally cylindrical in shape and having a front surface 12, a generally planar rear surface 14 opposite the front surface 12, a generally planar first end surface 16, a generally planar second end surface 18 opposite the first end surface 16, a generally planar first side surface 20 and a generally planar second side surface 22 opposite the first side surface 20. A first cutting edge 21 is formed at the intersection between the front surface 12 and the first end surface 16, and a second cutting edge 23 is formed at the intersection between the front surface 12 and the second end surface 18. The front surface 12 acts as a rake surface, and the rear surface 14 and the first and second side surfaces 20, 22 act as seating surfaces when the cutting insert 10 is performing a metal cutting operation.

Figure 10:
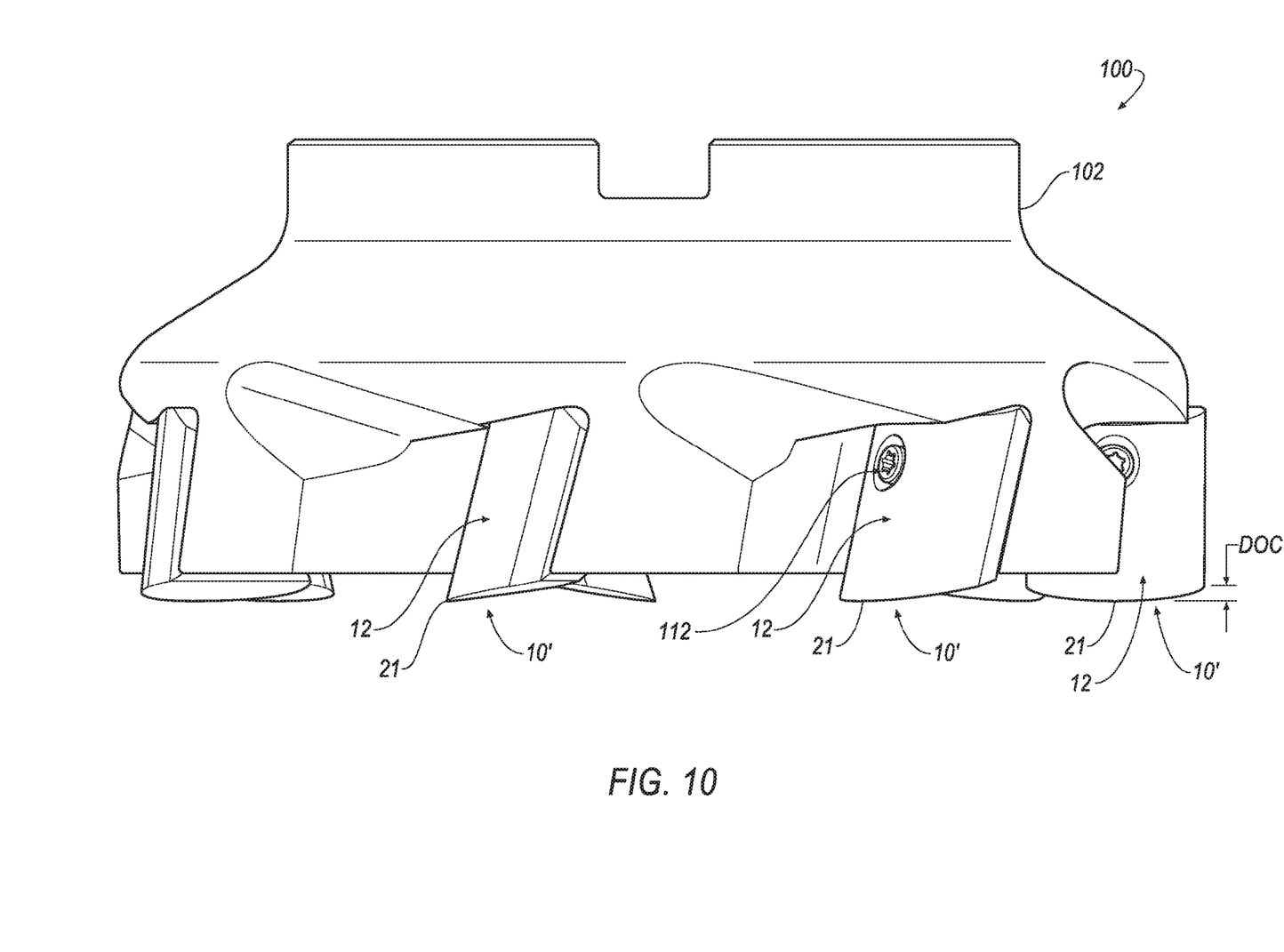
FIG. 10 is a side view of the exemplary embodiment of the cutting tool of FIG. 9 with the cutting insert of FIG. 6 mounted in a respective insert-receiving pocket.

In the illustrated embodiment, the cutting insert 10 is mirror symmetric about a central axis 24 (i.e. parallel to the z-axis) passing through a countersunk bore 26 that extends entirely through the cutting insert 10. The countersunk bore 26 is capable of receiving a mounting screw 112 for mounting the cutting insert 10 to a rotary cutting tool 100 (FIG. 10). Because the cutting insert 10 is mirror symmetric about the central axis 24, the first and second end surfaces 16, 18 are substantially identical to each other, and the first and second side surfaces 20, 22 are substantially identical to each other. It should be appreciated that the countersunk bore 26 is optional, and that the cutting insert 10 can be mounted to the cutting tool 100 using any well known means in the art. For example, the cutting insert 10 can be mounted to the cutting tool 100 using a clamp (not shown) that engages the front surface 12 of the cutting insert 10 in a suitable manner.

The cutting insert 10 may also include a chamfered surface 28 extending between the rear surface 14 and the first end surface 16, a chamfered surface 30 extending between the rear surface 14 and the second end surface 18, a chamfered surface 32 extending between the rear surface 14 and the first side surface 20, and a chamfered surface 34 extending between the rear surface 14 and the second end surface 22. The chamfered surfaces 28, 30, 32, 34 provide clearance when the cutting insert 10 is mounted in the rotary cutting tool 100 (FIG. 10).

Figure 1:
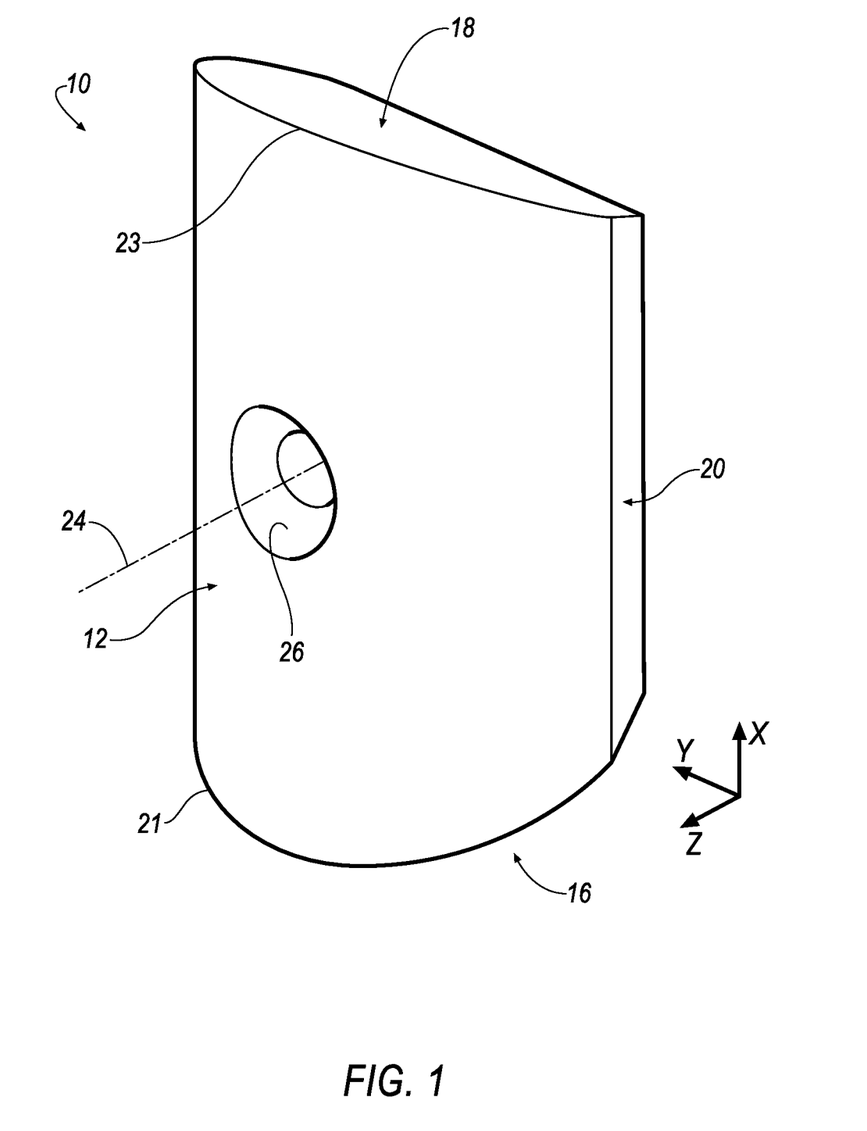
FIG. 1 is a front isometric view of an exemplary embodiment of a cutting insert of the invention.
Figure 2:
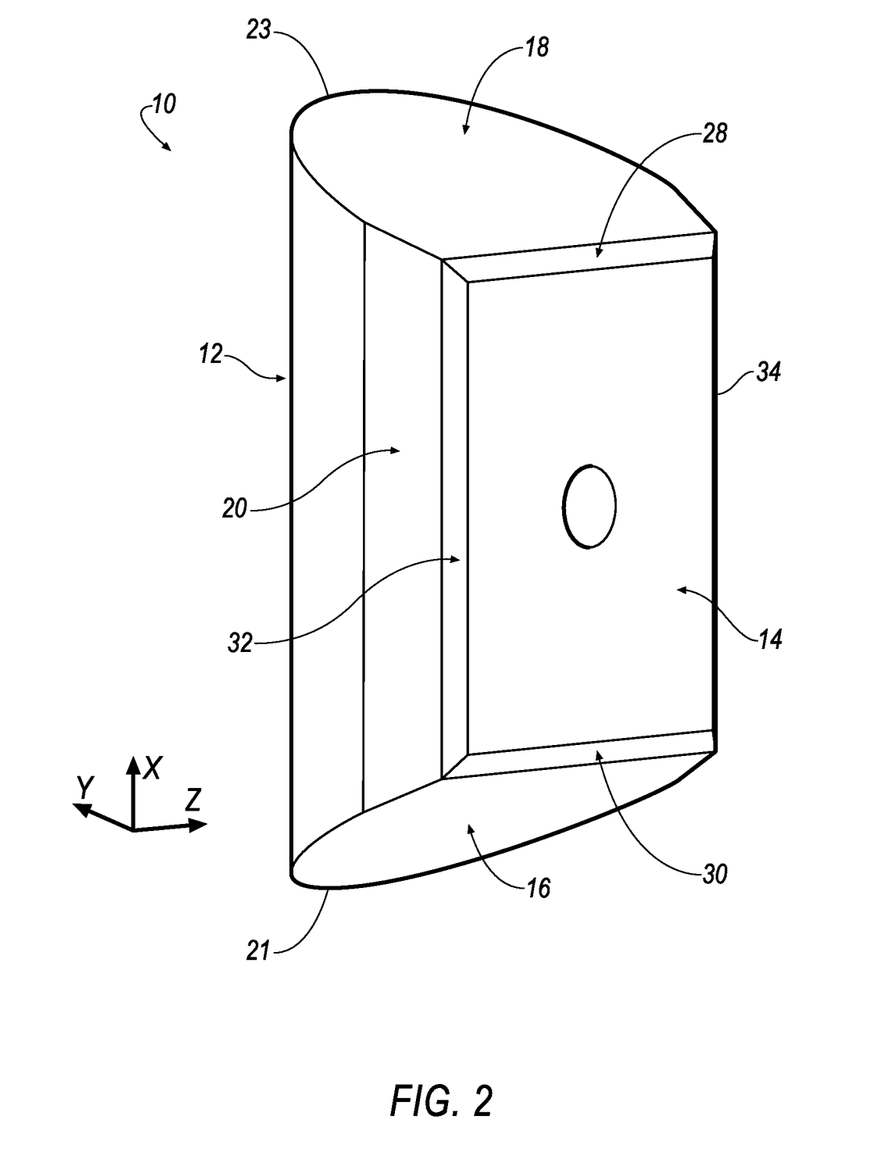
FIG. 2 is a rear isometric view of the exemplary embodiment of the cutting insert of FIG. 1.
Figure 3:
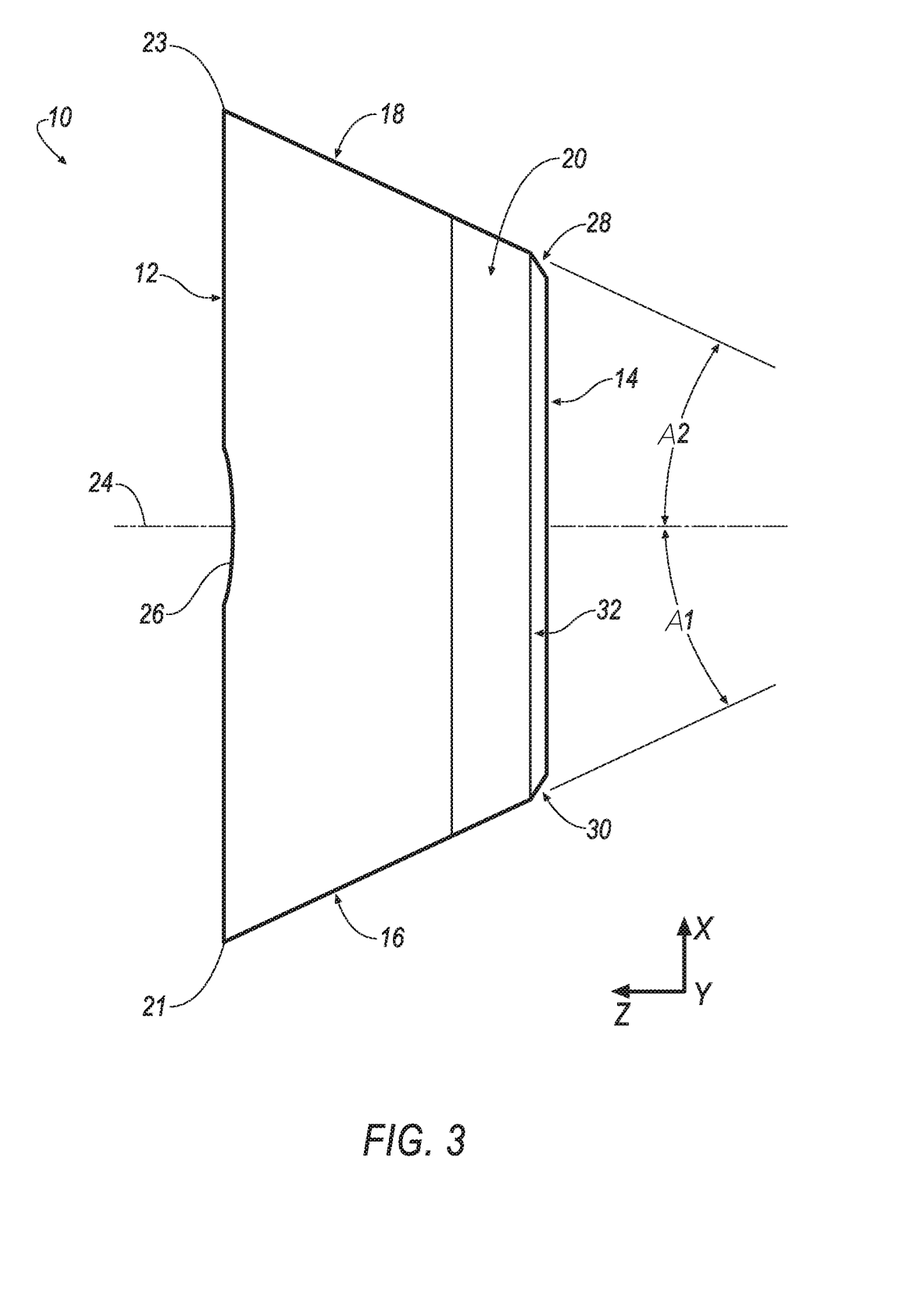
FIG. 3 is a side view of the exemplary embodiment of the cutting insert of FIG. 1.
Figure 4:
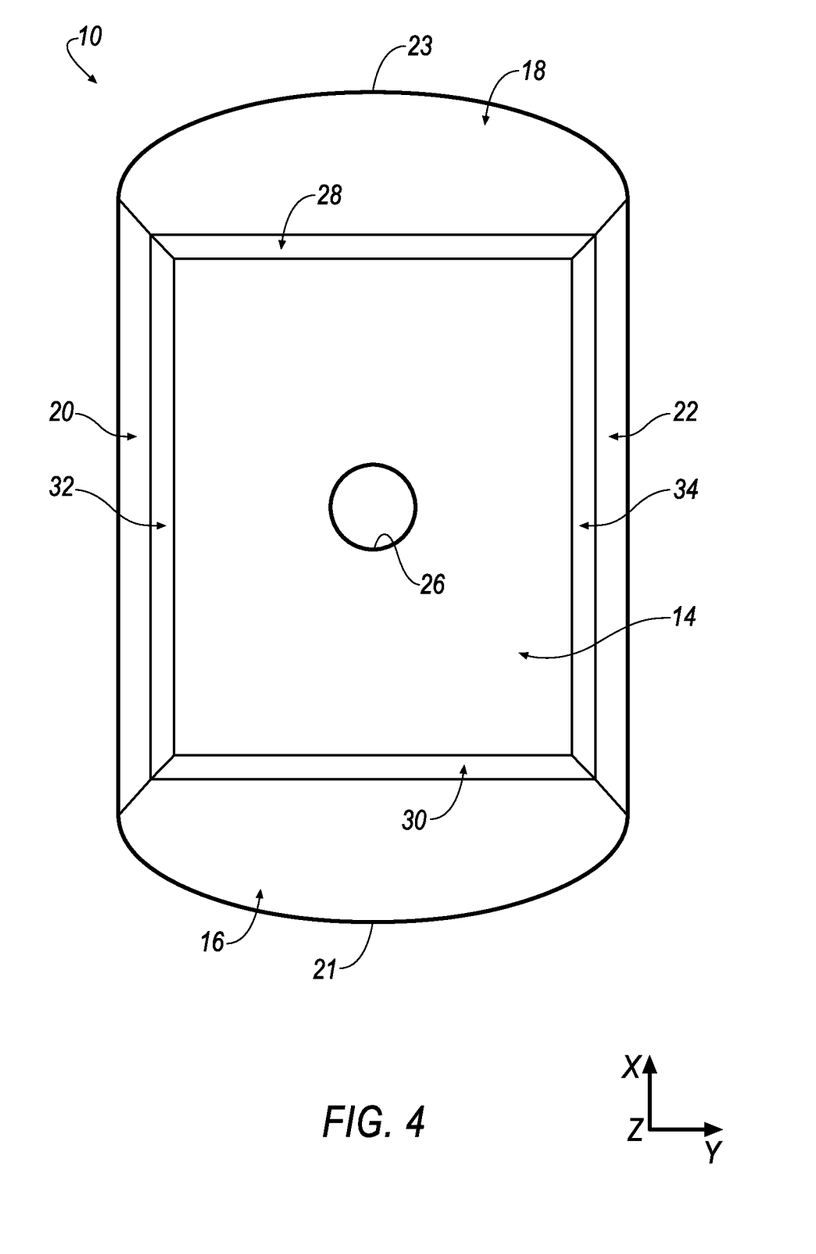
FIG. 4 is a rear view of the exemplary embodiment of the cutting insert of FIG. 1.

In the illustrated embodiment, the front surface 12 of the cutting insert 10, which acts as a rake face, is convex in shape. Specifically, the front surface 12 is a continuously outwardly curved surface that extends entirely between the first and second end surfaces 16, 18 and extends entirely between the first and second side surfaces 20, 22. As shown in FIG. 3, the first end surface 16 forms a clearance angle, A1, with respect to the central axis 24 of the cutting insert 10, and the second end surface 18 forms a clearance angle, A2, with respect to the central axis 24 of the cutting insert 10. In the illustrated embodiment, the clearance angles, A1, A2 can be an acute angle between about twenty (20) degrees and about sixty (60) degrees. For example, the clearance angles, A1, A2 may be about forty (40) degrees. Because the cutting insert 10 is mirror symmetric about the central axis 24, the clearance angle, A1, is equal or substantially equal, but opposite in magnitude, than the clearance angle, A2. However, it will be appreciated that the clearance angles, A1, A2, may not be identical to each other, and that the invention can be practiced with clearance angles, A1, A2 having different magnitudes. For example, the clearance angle, A1, can be about thirty-five (35) degrees, while the clearance angle, A2, can be about forty-five (45) degrees.

Figure 5:
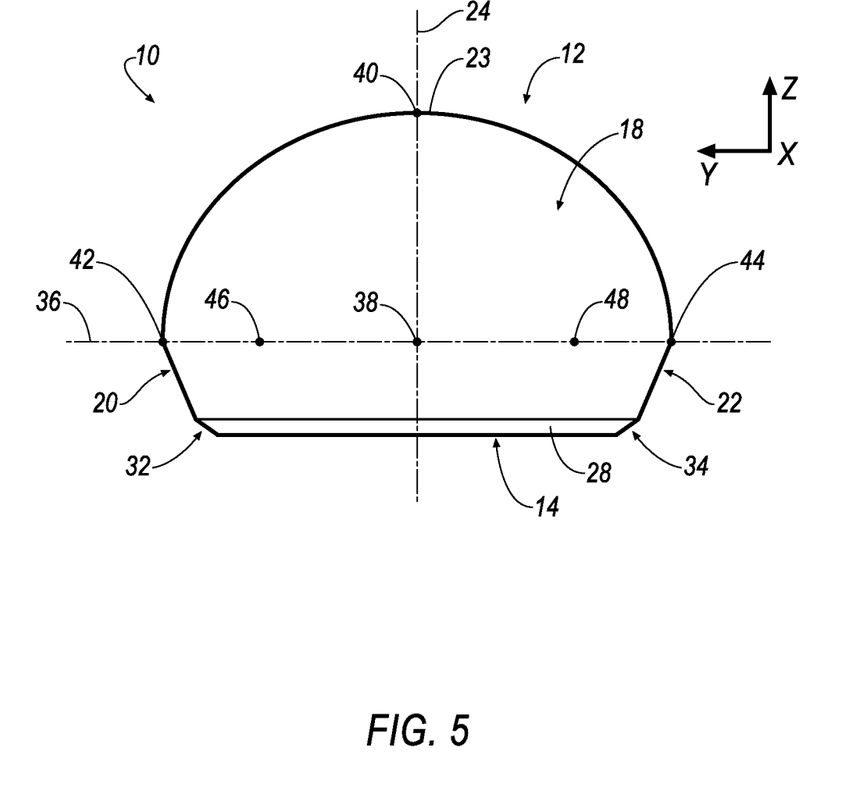
FIG. 5 is a top view of the exemplary embodiment of the cutting insert of FIG. 1.

The intersection of the first and second surfaces 16, 18 formed with the clearance angles, A1, A2 with the generally conical or cylindrical shape of the cutting insert 10 results in the cutting edges 21, 23 having an elliptical shape, as shown in FIG. 5. Because the cutting edges 21, 23 are identical to each other, only the cutting edge 23 is discussed below for brevity.

As shown in FIG. 5, the cutting edge 23 has two mutually perpendicular axes 24, 36 about which the cutting edge 23 is symmetric. These axes 24, 36 intersect at a center point 38 of the ellipse due to this symmetry. The larger of these two axes is the major axis 36, and the smaller of these two axes is the minor axis 24, which corresponds to the central axis passing through the countersunk bore 26.

The two points 46, 48 on the major axis 36 that are equidistant from the center point 38 are the two foci of the cutting edge 23. The point 40 where the axis 24 intersects the front surface 12 is where the curvature of the cutting edge 23 is minimum, and the point 42, 44 where the axis 36 intersects the cutting edge 23 is where the curvature of the front surface 12 is maximum. Thus, the curvature of the cutting edge 23 continuously varies with respect to each of the axes 24, 36. By definition, the eccentricity, e, of the ellipse is the ratio of the distance between the focal points 46, 48 to the length of the major axis 36.

It will be appreciated that the cutting edge 23 is not limited to a specific eccentricity, e, and that the invention can be practiced with any eccentricity, e, between zero (0), where the focal points 46, 48 coincide with the center point 38 and the cutting edge 23 is circular in shape, and one (1), where the cutting edge 23 gets a more elongated shape and tends towards a linear shape. For example, the invention can be practiced with an eccentricity, e, such as 0.05, 0.10, 0.15, 0.20, 0.25, 0.30, 0.35, 0.40, 0.45, 0.50, 0.55, 0.60, 0.65, 0.70, 0.75, 0.80, 0.85, 0.90 and 0.95. In the illustrated embodiment, the eccentricity, e, is about 0.25.

In addition, it should be appreciated that the magnitude of the clearance angles, A1, A2 determine the eccentricity of the cutting edges 21, 23. For example, the eccentricity of the cutting edges 21, 23 approaches zero (0) as the magnitude of the clearance angles, A1, A2 approach zero (0), and vice versa. As mentioned above, the clearance angles, A1, A2 can be an acute angle between about twenty (20) degrees and about sixty (60) degrees. For example, the clearance angles, A1, A2 may be twenty-five (25) degrees, thirty (30) degrees, thirty-five (35) degrees, forty (40) degrees, forty-five (45) degrees, fifty (50) degrees and/or fifty-five (55) degrees. In the illustrated embodiment the clearance angles, A1, A2 are about forty (40) degrees.

Figure 6:
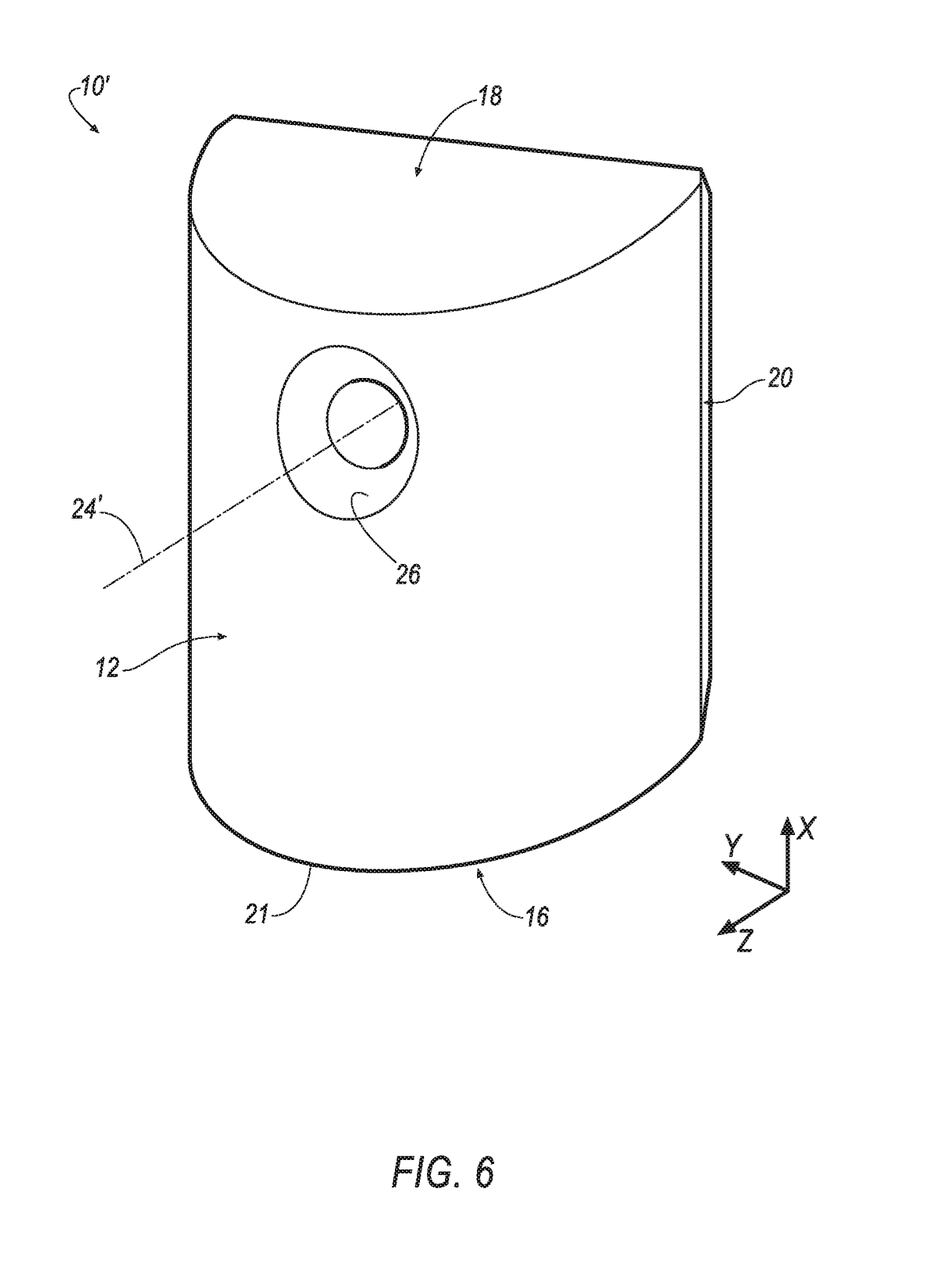
FIG. 6 is a front isometric view of another exemplary embodiment of a cutting insert of the invention
Figure 7:
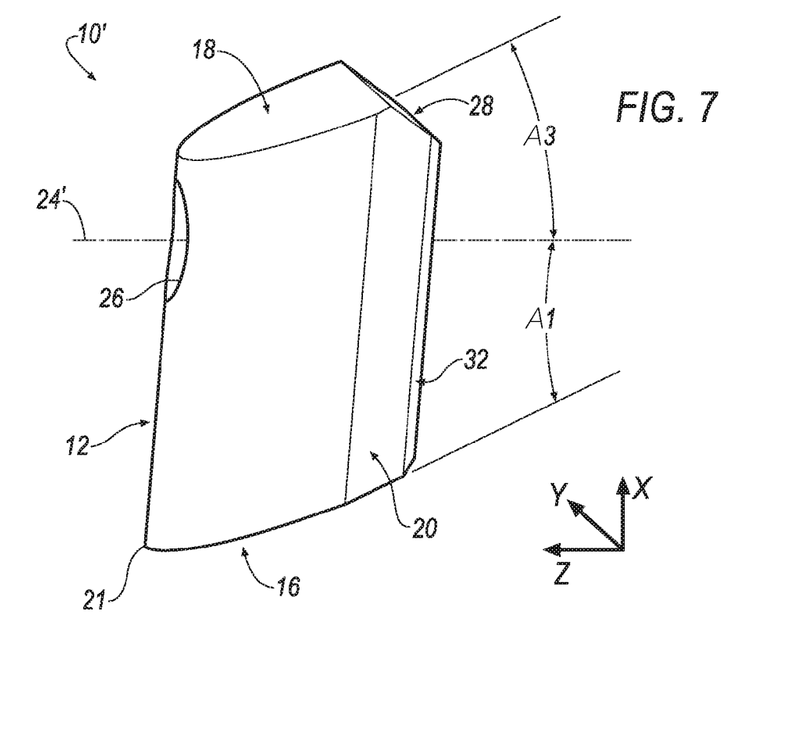
FIG. 7 is another isometric view of the exemplary embodiment of the cutting insert of FIG. 6.
Figure 8:
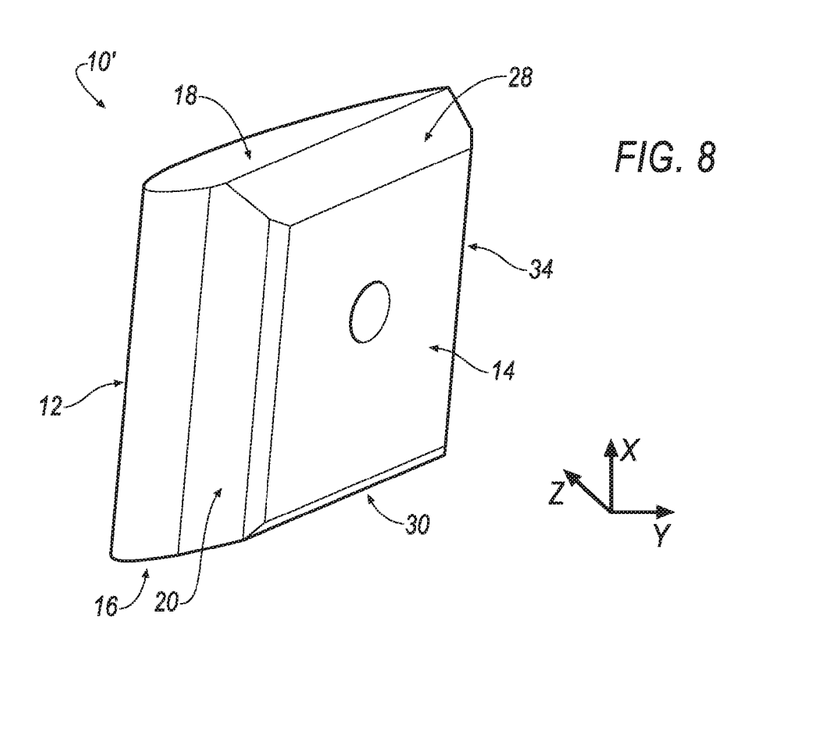
FIG. 8 is a rear isometric view of the exemplary embodiment of the cutting insert of FIG. 6.

In the illustrated embodiment, the cutting insert 10 is indexable by rotating the cutting insert 180 degrees about the central axis 24. However, it will be appreciated that the invention is not limited to an indexable cutting insert, and that the principles of the invention can be practiced with a non-indexable cutting insert. For example, FIGS. 6-8 show a non-index able cutting insert 10' according to an alternate embodiment of the invention. The cutting insert 10' is substantially identical to the cutting insert 10, except that the second end surface 18 forms an angle, A3, with respect to an axis 24' passing through the countersunk bore 26. In the illustrated embodiment, the first end surface 16 is parallel or substantially parallel to the second end surface 18, as shown in FIG. 7. As a result, the angle, A1, is equal or substantially equal to the angle, A3.

In this embodiment, the cutting insert 10' is not mirror symmetric about the axis 24', unlike the cutting insert 10 that is mirror symmetric about the central axis 24. Thus, the axis 24' passing through the countersunk bore 26 of the cutting insert 10' need not be centrally located because the cutting insert 10' is mounted in the rotary cutting tool 100 in such a way that only the cutting edge 21 is used in a cutting operation. However, the countersunk bore 26 can be located such that the axis 24 passing through the countersunk bore 26 is centrally located, if desired.

Figure 9:
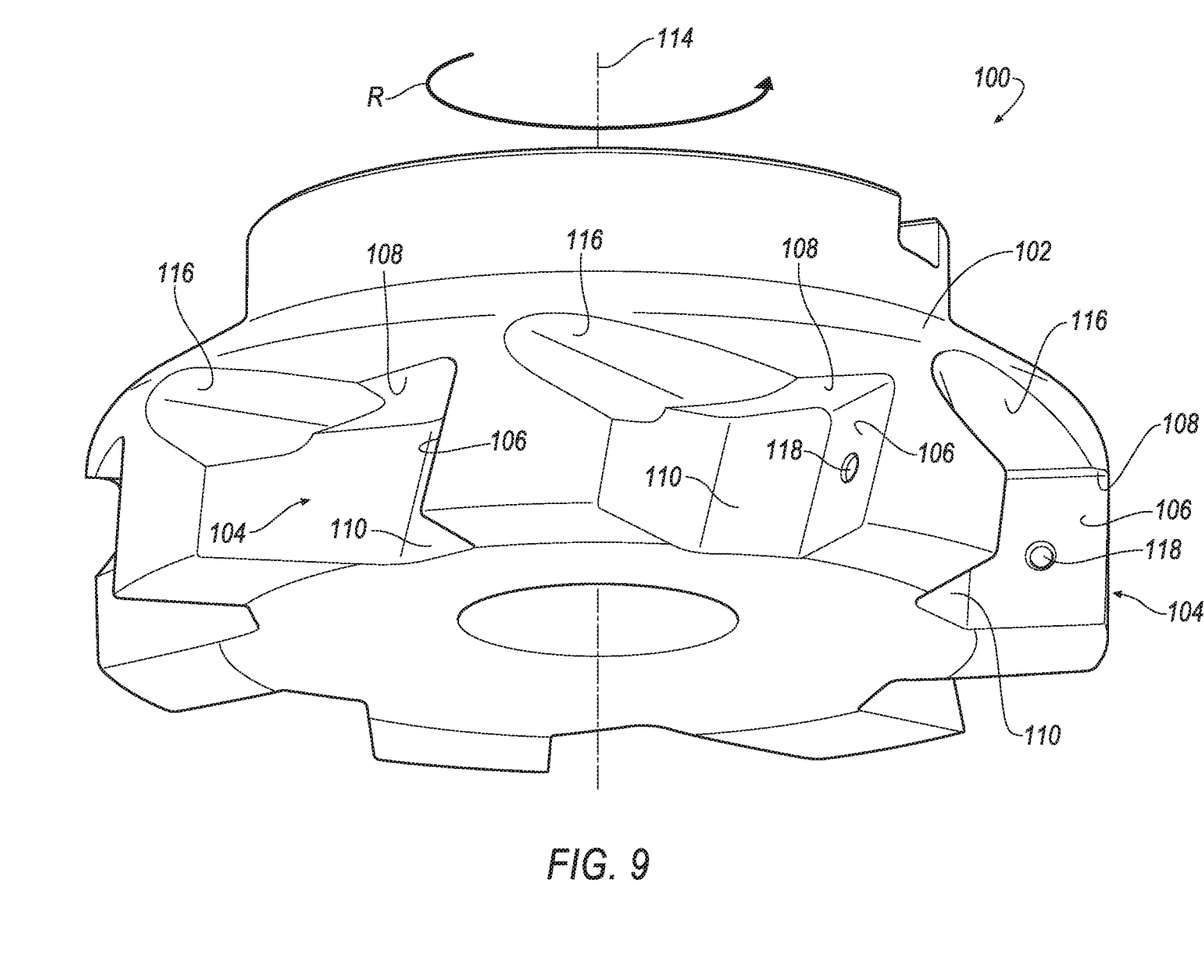
FIG. 9 is a bottom isometric view of an exemplary embodiment of a rotary cutting tool without the cutting insert of FIG. 6 mounted in a respective insert-receiving pocket.

Referring now to FIGS. 9 and 10, a rotary cutting tool 100, for example, a milling cutter, includes a body 102 with a plurality of insert-receiving pockets 104 capable of receiving the cutting insert 10, 10' of the invention. In the illustrated embodiment, the cutting tool 100 includes seven (7) insert-receiving pockets 104. However, it will be appreciated that the invention in is not limited by the number of insert-receiving pockets 104, and that the invention can be practiced with any desirable number of insert-receiving pockets 104, depending on the dimensions of the cutting tool 100.

In the illustrated embodiment, the cutting insert 10' is mounted in the insert-receiving pockets 104. However, it will be appreciated that the cutting insert 10 can be mounted in a similar insert-receiving pocket 104 of the cutting tool 100.

In general, each insert-receiving pocket 104 includes a bottom support surface 106, a first side support surface 108 and a second side support surface 110, as shown in FIG. 9. The cutting tool 100 may also include a flute 116 for assisting in the evacuation of chips generated during a metal cutting operation.

As shown in FIG. 10, The bottom support surface 106 engages the rear surface 14 of the cutting insert 10, 10', and each of the sides support surfaces 108, 110 engages one of the first and second end surfaces 16, 18 and one of the first and second side surfaces 20, 22 of the cutting insert 10, 10' when mounted in the insert-receiving pocket 104, thereby providing three-point contact between the cutting insert 10, 10' and the insert-receiving pocket 104. The cutting insert 10, 10' is secured to the insert-receiving pocket 104 by a mounting screw 112. The bottom support surface 106 may include a threaded bore 118 for receiving the mounting screw 112. When mounted in a spindle (not shown), the cutting tool 100 rotates about a central axis 114 in a direction of rotation, R, when performing a metal cutting operation.

As shown in FIG. 10, the elliptical shape of the cutting edge 21 of the cutting insert 10' (and also the cutting edge 23 of the cutting insert 10) produces a relatively small depth-of-cut, DOC. The depth-of-cut, DOC, of the cutting insert 10, 10' can be selectively adjusted by selecting the eccentricity, e, of the elliptical shape of the cutting edges 21, 23. It should be appreciated that the depth-of-cut, DOC, is relatively larger when the eccentricity, e, approaches zero (0) and the cutting edges 21, 23 are circular in shape, and relatively smaller when the eccentricity, e, approaches one (1) and the cutting edges 21, 23 is more linear in shape. However, regardless of the eccentricity, e, the cutting insert 10, 10' has a relatively small depth-of-cut, DOC, as compared to conventional cutting inserts. As a result, the cutting insert 10, 10' is capable of producing an extremely fine finish on a workpiece (not shown) as compared to conventional cutting inserts.

The patents and publications referred to herein are hereby incorporated by reference.

Having described presently preferred embodiments the invention may be otherwise embodied within the scope of the appended claims.

What is claimed is:

1. A cutting insert, comprising:
   a front surface,
   a rear surface opposite the front surface,
   a first end surface,
   a second end surface opposite the first end surface,
   a first side surface,
   a second side surface opposite the first side surface,
   a first cutting edge formed at an intersection between the front surface and the first end surface,
   wherein the front surface is continuously convex and extends entirely between the first and second end surfaces and entirely between the first and second side surfaces;
   wherein the first cutting edge is elliptical in shape; and
   wherein the first and second end surfaces are substantially identical to each other, and wherein the first and second side surfaces are substantially identical to each other.

2. The cutting insert of claim 1, wherein the first cutting edge has an eccentricity between zero and one.

3. The cutting insert of claim 1, further comprising a second cutting edge formed at an intersection between the front surface and the second end surface.

4. The cutting insert of claim 1, wherein the cutting insert is indexable.

5. The cutting insert of claim 1, further comprising a countersunk bore extending entirely through the front and rear surfaces of the cutting insert.

6. The cutting insert of claim 5, wherein the cutting insert is mirror symmetric about a plane containing a central axis passing through the countersunk bore, the plane also passing through both side surfaces.

7. The cutting insert of claim 5, wherein the cutting insert is mirror symmetric about a plane containing a central axis passing through the countersunk bore, the plane also passing through both end surfaces.

8. The cutting insert of claim 1, wherein the first end surface forms a clearance angle (A1) with respect to a central axis of the cutting insert.

9. The cutting insert of claim 8, wherein the second end surface forms a clearance angle (A2) that is equal to the first clearance angle (A1) but opposite in magnitude.

10. The cutting insert of claim 1, wherein the first and second end surfaces are planar.

11. The cutting insert of claim 1, wherein the first and second side surfaces are planar.

12. A milling cutter comprising a cutter body with a plurality of insert receiving pockets, and a cutting insert of claim 1 mounted in each of the insert receiving pockets.

13. A cutting insert, comprising:
   a front surface,
   a rear surface opposite the front surface,
   a first end surface,
   a second end surface opposite the first end surface,
   a first side surface,
   a second side surface opposite the first side surface,
   a first cutting edge formed at an intersection between the front surface and the first end surface,
   wherein the front surface is continuously convex and extends entirely between the first and second end surfaces and entirely between the first and second side surfaces;
   wherein the first cutting edge is elliptical in shape; and
   wherein the first end surface is parallel to the second end surface.

14. The cutting insert of claim 13, wherein the first end surface forms a clearance angle (A1) with respect to an axis of the cutting insert.

15. The cutting insert of claim 14, wherein the second end surface forms a clearance angle (A3) that is equal to the first clearance angle (A1).

16. The cutting insert of claim 13, wherein the first cutting edge has an eccentricity between zero and one.

17. The cutting insert of claim 13 further comprising a countersunk bore extending entirely through the front and rear surfaces of the cutting insert.

\* \* \* \* \*